(12) United States Patent
Martin et al.

(10) Patent No.: US 10,378,209 B2
(45) Date of Patent: Aug. 13, 2019

(54) COMPOSITE SUCKER ROD WITH SUPPORT SLEEVE

(71) Applicant: 136 Holdings, LLC, Mishawaka, IN (US)

(72) Inventors: Jonathan R. Martin, South Bend, IN (US); Charles I. Woods, South Bend, IN (US)

(73) Assignee: 136 Holdings, LLC, Mishawaka, IN (US)

( * ) Notice: Subject to any disclaimer, the term of this patent is extended or adjusted under 35 U.S.C. 154(b) by 0 days.

(21) Appl. No.: 15/959,051

(22) Filed: Apr. 20, 2018

(65) Prior Publication Data

US 2018/0305930 A1 Oct. 25, 2018

Related U.S. Application Data

(60) Provisional application No. 62/488,053, filed on Apr. 20, 2017.

(51) Int. Cl.
*E04C 5/08* (2006.01)
*B29C 70/02* (2006.01)
(Continued)

(52) U.S. Cl.
CPC ............ *E04C 5/085* (2013.01); *B29C 70/025* (2013.01); *C08J 5/042* (2013.01); *E21B 17/1071* (2013.01);
(Continued)

(58) Field of Classification Search
CPC ....... E21B 17/00; E21B 17/04; Y10T 403/473
See application file for complete search history.

(56) References Cited

U.S. PATENT DOCUMENTS 1,756,205 A * 4/1930 Merrick .................. E21B 17/00
  52/848
2,453,079 A 11/1948 Rossmann
(Continued)

OTHER PUBLICATIONS

Get More Out of Your Well With Megalex Carbon Fiber Sucker Rods; Megalex Rods, Apr. 20, 2017; 4 pages; http://megalexrods.com.

(Continued)

*Primary Examiner* — Matthieu F Setliff
(74) *Attorney, Agent, or Firm* — Mark W. Hanley

(57) ABSTRACT

A composite sucker rod (12) has a tension rod (16) formed of a carbon fiber reinforced phenolic material and a support sleeve (18) formed of aluminum. The support sleeve (18) extends around the tension rod (16). A compressive preload is applied to the support sleeve (18) and a corresponding tensile preload is applied to the tension rod (16). The tensile preload reduces compressive loads applied to the tension rod (16). The compressive preload and the tensile preload are applied by differences in coefficients of thermal expansion of the materials from which the support sleeve (18) and the tension rod (16) are formed, and exposure to well temperatures. Opposite terminal end sections of the tension rod (16) have exterior peripheries (62) which are formed to define compound progressive radii provided having indentions (64) and protuberances (66) which fit in cooperative relation with formed surfaces of clamping members (34, 36) of end fittings (14) having profiles (38) to secure the end fittings to the tension rod (16).

19 Claims, 12 Drawing Sheets

(51) Int. Cl.
*C08J 5/04* (2006.01)
*E21B 17/10* (2006.01)
*E21B 43/12* (2006.01)
B29L 31/06 (2006.01)

(52) U.S. Cl.
CPC ......... *E21B 43/121* (2013.01); *B29L 2031/06* (2013.01)

(56) References Cited

U.S. PATENT DOCUMENTS

| | | | |
|---|---|---|---|
| 3,212,582 A | 10/1965 | Brown | |
| 3,486,557 A * | 12/1969 | Harrison | E21B 17/00 |
| | | | 166/68 |
| 3,769,813 A * | 11/1973 | Okada | F16C 1/02 |
| | | | 464/180 |
| 3,948,010 A * | 4/1976 | Sonneville | B28B 23/043 |
| | | | 52/223.13 |
| 4,205,926 A | 6/1980 | Carlson | |
| 4,360,288 A | 11/1982 | Rutledge, Jr. et al. | |
| 4,396,211 A | 8/1983 | McStravick et al. | |
| 4,401,396 A * | 8/1983 | McKay | E21B 17/00 |
| | | | 403/13 |
| 4,516,608 A * | 5/1985 | Titus | F16L 9/14 |
| | | | 138/120 |
| 4,592,421 A * | 6/1986 | Hoffmann | E21B 17/00 |
| | | | 166/105 |
| 4,602,892 A | 7/1986 | Brookstein et al. | |
| 4,653,953 A | 3/1987 | Anderson et al. | |
| 5,174,679 A | 12/1992 | Wolf | |
| 5,470,118 A * | 11/1995 | Burton | E21B 17/06 |
| | | | 294/86.18 |
| 5,862,866 A | 1/1999 | Springer | |
| 6,193,431 B1 | 2/2001 | Rutledge | |
| 6,336,986 B1 * | 1/2002 | Lee | B29C 70/088 |
| | | | 156/160 |
| 6,863,763 B2 * | 3/2005 | Lee | F16C 3/026 |
| | | | 156/188 |
| 6,886,484 B2 | 5/2005 | Thomas | |
| 7,080,691 B1 | 7/2006 | Kegin | |
| 7,108,063 B2 | 9/2006 | Carstensen | |
| 7,543,895 B2 * | 6/2009 | Burkett | B60B 35/14 |
| | | | 301/124.1 |
| 7,730,938 B2 | 6/2010 | Rutledge, Sr. | |
| 8,500,943 B2 | 8/2013 | Rutledge, Sr. | |
| 2005/0159229 A1* | 7/2005 | Lee | F16C 3/026 |
| | | | 464/181 |
| 2014/0262206 A1 | 9/2014 | Ferguson et al. | |
| 2016/0102694 A1 | 4/2016 | Gernentz et al. | |
| 2016/0201403 A1* | 7/2016 | Sen | E21B 17/00 |
| | | | 166/242.6 |

OTHER PUBLICATIONS

Wy-Yang Chu, Chi-Mei Hasiao and Tian-Hua Liu, Fatigue Under Cyclic Compressive Load, Department of Metal Physics, Beijing Uniersity of Iron and Steel Technology, Beijing, Peoples Republic of China, 1 Fagiue Engng. Mater. Struct., vol. 7, No. 4, pp. 279-284, Fatigue of Engineering Materials, Ltd., Great Britain, 1984.

* cited by examiner

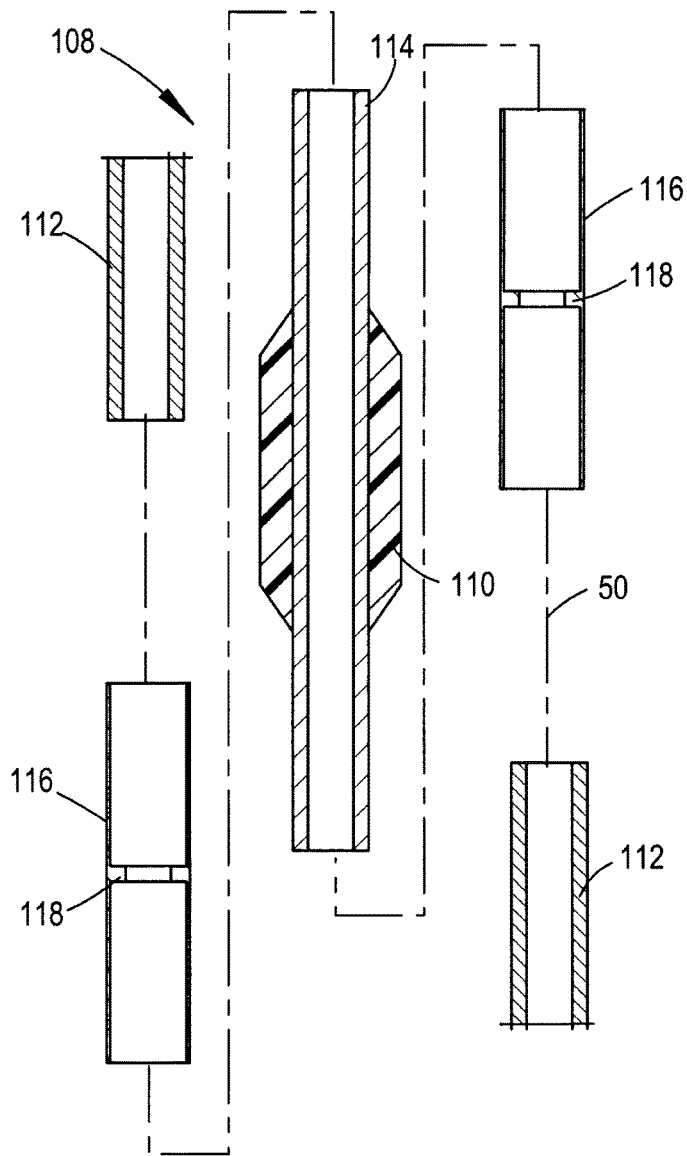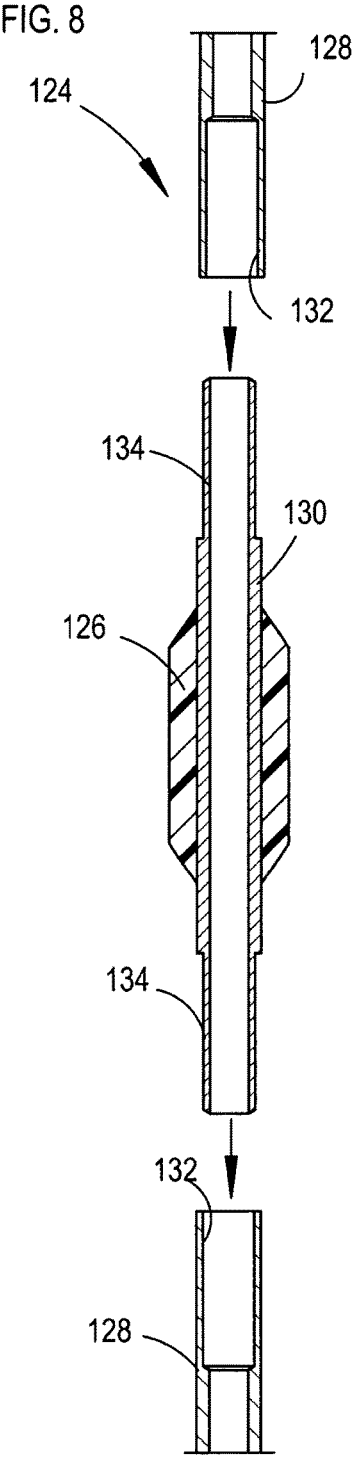

COMPOSITE SUCKER ROD WITH SUPPORT SLEEVE

CROSS-REFERENCE TO RELATED APPLICATION

The present application claims priority as a continuation-in-part of U.S. Provisional Patent Application Ser. No. 62/488,053, filed Apr. 20, 2017, entitled "Composite Sucker Rod Assembly With Tension Sleeve," and invented by Jonathon R. Martin and Charles I. Woods, inventors of the present application.

TECHNICAL FIELD

The present invention relates in general to sucker rods for down-hole well pumps, and in particular to sucker rods formed of fiber reinforced thermoset plastics.

BACKGROUND

Composite sucker rods have been used for a number of years to replace much heavier steel sucker rods used for artificial lift in downhole pumps. Fiberglass rods were first used and today carbon fiber rods have been developed for use. Composite rods perform well in tension, but will fail in compression, often splintering and sometimes creating "bird's nests" which requires pulling production tubing to remove failed sucker rod components from the well, which is extremely costly. During use, sucker rods are reciprocated upward and downward within production tubing to pull fluids from within wells, stretching the sucker rods as loads are applied and then sometimes compressing the sucker rods as loads are released, and subjecting sucker rods to cyclical loads. Other well dynamics, such as stuck pumps from trash, deviation, crooked well-bores with changing geometry can also induce compression loads into the sucker rod string.

SUMMARY

A composite sucker rod is provided for use with positive displacement pumps of artificial lift systems in wells. The composite sucker rod has a continuous outer support sleeve which is pre-loaded in compression, and a continuous composite rod which is pre-loaded in tension. The tension rod is formed of a pultrusion of carbon fiber reinforced phenolic material and the support sleeve formed of aluminum. The support sleeve extends around the tension rod and supports compressive loads. A compressive preload is applied to the support sleeve and a corresponding tensile preload is applied to the tension rod. The tensile preload reduces compressive loads applied to the tension rod. The compressive preload and tensile preload are applied by differences in coefficients of thermal expansion of the materials from which the support sleeve and the tension rod are formed, and exposure to well temperatures. Opposite terminal end sections of the tension rod have exterior peripheries which are formed in a post-process after the initial fiber rod pultrusion process, by heat forming the fiber rod pultrusion at the glass transition temperature to define compound progressive radii provided by indentions and protuberances which fit in cooperative relation with formed surfaces of clamping members of end fittings to secure the end fittings to the tension rod. Preferably, the composite sucker rod is used downhole in a well, with no preload applied at ambient surface temperatures, and downhole temperature will apply preload forces to place the support sleeve in compression and the tension rod in tension due to differences in coefficients of thermal expansion of the materials from which the support sleeve and tension rod are formed. In other embodiments, the compression sleeve may be preloaded with a compressive force and the tension rods may be preloaded in tension at ambient surface temperatures.

DESCRIPTION OF THE DRAWINGS

For a more complete understanding of the present invention and the advantages thereof, reference is now made to the following description taken in conjunction with the accompanying Drawings in which FIGS. 1 through 14 show various aspects for a composite sucker rod with support sleeve made according to the present disclosure, as set forth below:

FIG. 1 is a partial front, elevation view of composite sucker rod with support sleeve;

FIG. 2 is a partial longitudinal section view of the sucker rod with support sleeve, taken along section line 2-2 of FIG. 1;

FIG. 3 is an exploded perspective view of an end fitting for the sucker rod of FIG. 2;

FIG. 4 is a partial longitudinal section view of a tension rod of FIG. 2, shown between two clamp members, taken along section line 2-2 of FIG. 1;

FIG. 5 is a perspective view of a heat mold mounted to an end of a tension rod of the composite sucker rod;

FIG. 6 is a longitudinal section view of the heat mold, taken along section line 6-6 of FIG. 5;

FIG. 7 is an exploded, longitudinal section view of an alternative support sleeve with centralizer;

FIG. 8 is an exploded, longitudinal section view of a second alternative support sleeve with centralizer;

FIG. 9 is an exploded, partial longitudinal section view of a third alternative support sleeve with centralizers;

FIG. 10 chart of the properties of aluminum for modulus of elasticity and yield strength verses temperature;

FIG. 11 is a chart of tension rod tensile stress over time during operations;

FIG. 12 is a chart showing various configurations for evaluating Euler's Column Load and maximum compressive load prior to buckling;

FIG. 13 is a chart showing finite element analysis results of the assembly and its behaviors as a representation of actual use in the Eagle Ford production region and its associated subsurface thermal gradients, the most extreme in the United States, validating the engineering fitness for use and design; and FIG. 14 is a chart showing finite element analysis results of the assembly and its behaviors as a representation of actual use in the Permian Basin production region and its associated subsurface thermal gradients, the most conservative in the United States, validating the engineering fitness for use and design.

DETAILED DESCRIPTION

Figure 1:
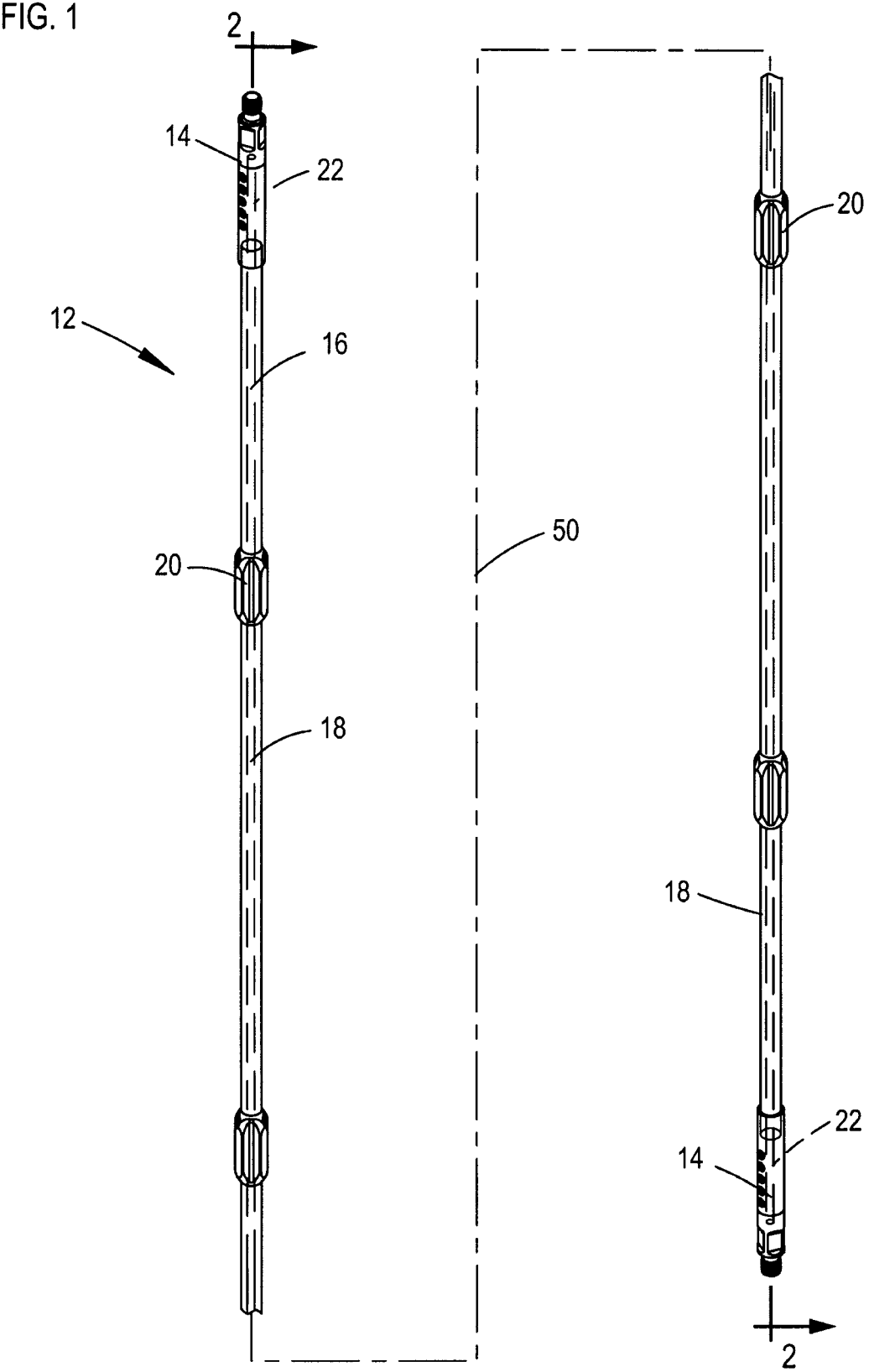

Referring to the Figures, FIG. 1 is a partial front, elevation view of a composite sucker rod 12 having end fittings 14, a tension rod 16, a support sleeve 18 and centralizers 20 which are concentrically disposed with a longitudinal axis 50. The composite sucker rod is preferably 25 to 37.5 feet long, and roughly one inch to one and one-half inches in outside diameter. The end fittings 14 preferably have conventional threaded ends for mating with standard threaded couplings as are commonly used for joining adjacent sucker rods in strings for transmitting mechanical power to downhole positive displacement pumps used for artificial lift in wells. The tension rod 16 is preferably a composite rod having opposite terminal end sections 22 to which respective ones of the end fittings 14 are secured. The tension rod 16 is provided by a fiber reinforced thermoset polymer material, preferably formed of a phenolic polymer.

The support sleeve 18 is preferably a continuous sleeve which extends around and encloses the tension rod 16, extending between the two end fittings 14. The support sleeve 18 is preferably provided by an aluminum sleeve formed of 6061-T6 aluminum. The materials and physical dimensions of the tension rod 16 and the support sleeve 18 are selected for operating in cooperative relation to pre-tension the tension rod 16 and pre-load the support sleeve 18 with compressive loads at operating temperatures, such as those encountered in subterranean wells, such that excessive compressive loads are not applied to the tension rod 16. The centralizers 20 are mounted exteriorly around the support sleeve 18, preferably over-molded onto the aluminum support sleeve 18 and formed of a fiber reinforced polymeric material, such as phenolic as a wear resistant thermoset fiber and/or mineral filled phenolic, or fiber and/or mineral reinforced thermoplastic resins such as polyphathalamide (PPA), polypheneylenesulfide (PPS), or polyarthletherketone (PAEK), or a combination of the above. Centralizers similar to the centralizers 20 are commonly known in the oil and gas industry for use directly on the body of sucker rods or tension rods, and are disclosed in U.S. Pat. No. 9,869,135, issued Jan. 16, 2018 and invented by Jonathon R. Martin, which is hereby incorporated by reference as if fully set forth herein.

Figure 2:
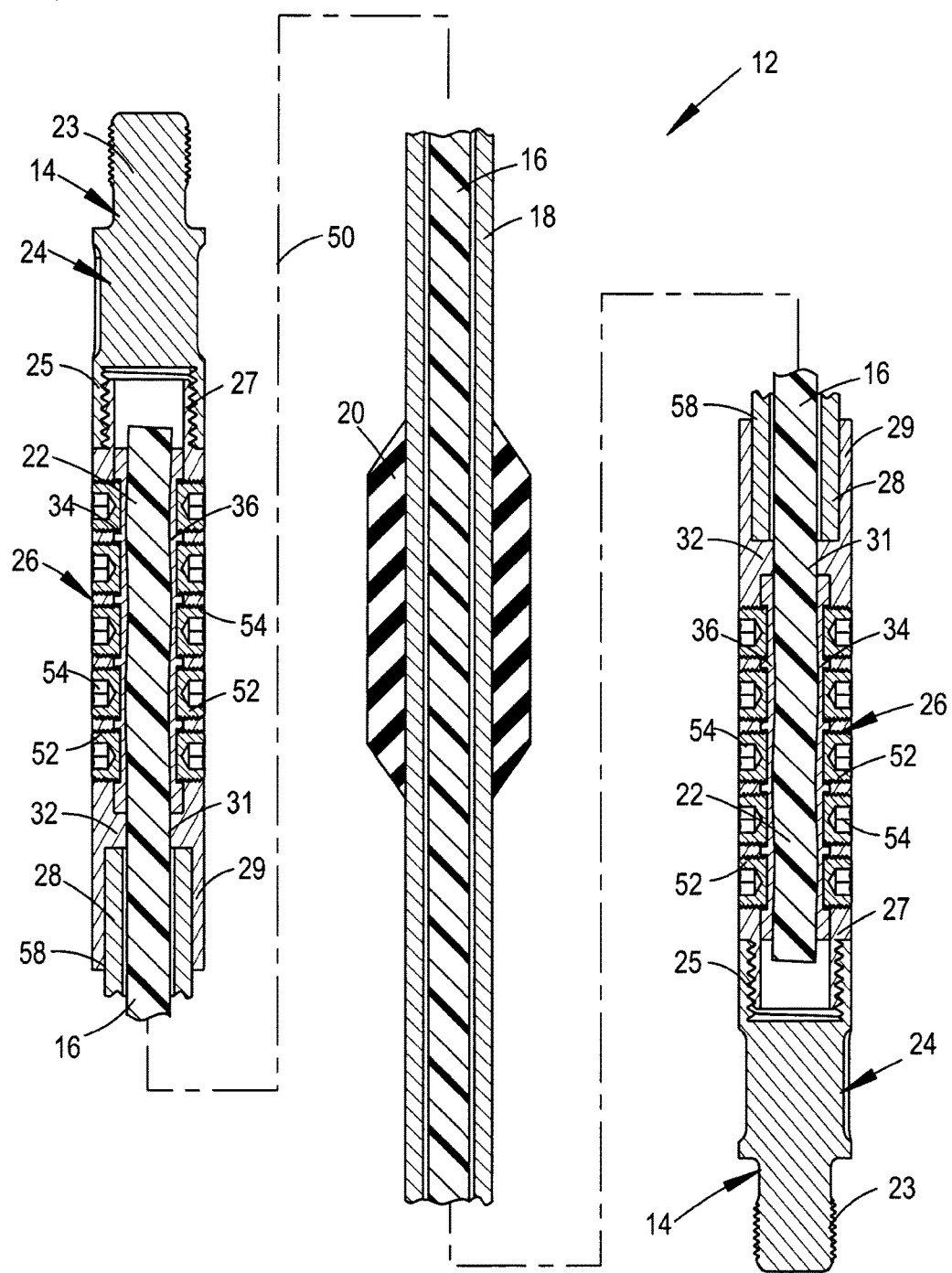

FIG. 2 is a partial longitudinal section view of the sucker rod 12, taken along section line 2-2 of FIG. 1. The end fittings 14 each have an adapter section 24 and a clamp section 26. The adapter section 24 has a pin end 23 with the conventional threaded end for mating with standard threaded couplings, and a box end 24 which is threaded for threadingly securing to a threaded terminal pin end 27 of the clamp section 26. The pin end 27 of the clamp section has an opening 56 which extends concentric with the longitudinal axis 50.

The clamp section 26 is tubular shaped, with an open interior which extends continuously through the clamp section 26 and includes a first socket 28, a second socket 30 and an opening 31 extending between the first socket 28 and the second socket 30. The first socket 28, the second socket 30 and the opening 31 are preferably concentrically disposed with the longitudinal axis 50. The first socket 28 and the second socket 30 are separated by a boss 32 which is annular shaped and through which the opening 31 extends, concentric with the longitudinal axis 50. The opening 31 is sized for receiving the terminal end 22 of the tension rod 16. The first socket 28 has annular-shaped spaced defined between the exterior of the terminal end 22 of the tension rod 16 and the interior surface of the clamp section 26 defined by the first socket 28, which is preferably cylindrically shaped. The annular-shaped space of the first socket 28 is sized for receiving an end portion 58 of the support sleeve 18. The end fittings 14 are disposed in opposed relation on opposite ends of the tension rod 16 and the support sleeve 18, with respective ones of the first sockets 28 disposed in opposed relation for receiving the terminal ends 22 of the tension rods 16 and end portions 58 of the support sleeve 18. The second socket 30 has the opening 56 for slidably receiving two clamp members 34 and 36. First ends of the clamp members 34 and 36 engage the boss 32, which provides a stop positioning the clamp members 34 and 36 within the socket 30 along the longitudinal axis 50 in alignment with through holes 52 extending through sidewalls of the clamp section 26, transverse to the longitudinal axis 50. Two sets of through holes 52 are preferably provided in opposed relation on opposite sides of the clamp section 26, with five of the through holes 52 on each side. The through holes 52 are threaded for receiving lock screws 52.

Figure 3:
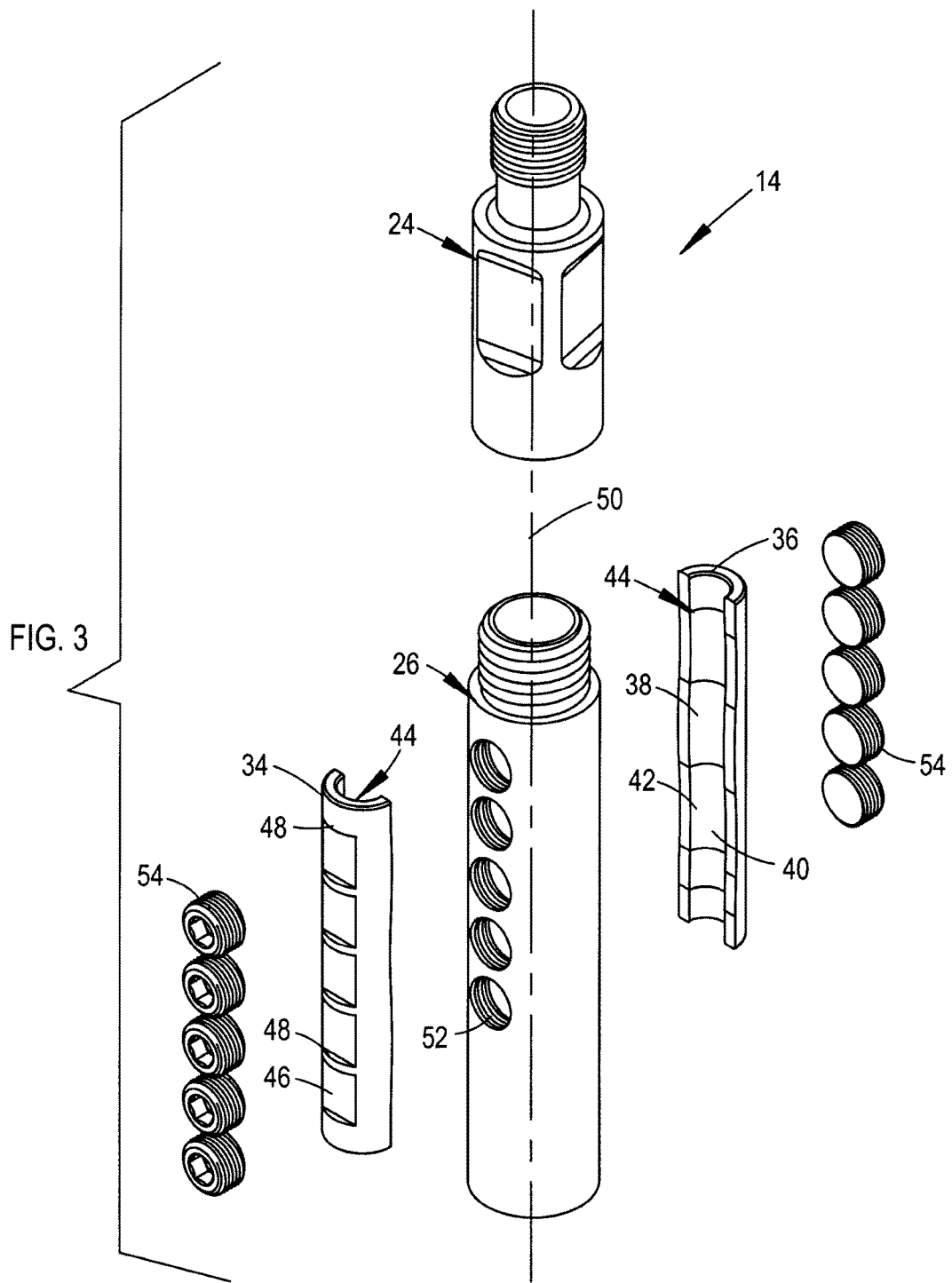

FIG. 3 is an exploded perspective view of one of the end fittings 14 for the sucker rod 12. Outwardly disposed surfaces of the clamp members 34 and 36 have flats 46 formed thereon, in spaced apart relation for registering in alignment with the through holes 52. Outwardly extending protrusions 48 are located on opposite sides of the flats, spaced apart and disposed in parallel relation to the longitudinal axis 50. The lock screws 52 engage within the threaded through holes 52 and are torqued to press against respective ones of the flats 46 the clamp members 34 and 36. The protrusions 48 extend on opposite sides of the lock screws to engage the lock screws 54 and prevent the clamp members 34 and 36 from moving parallel to the longitudinal axis 50.

Figure 4:
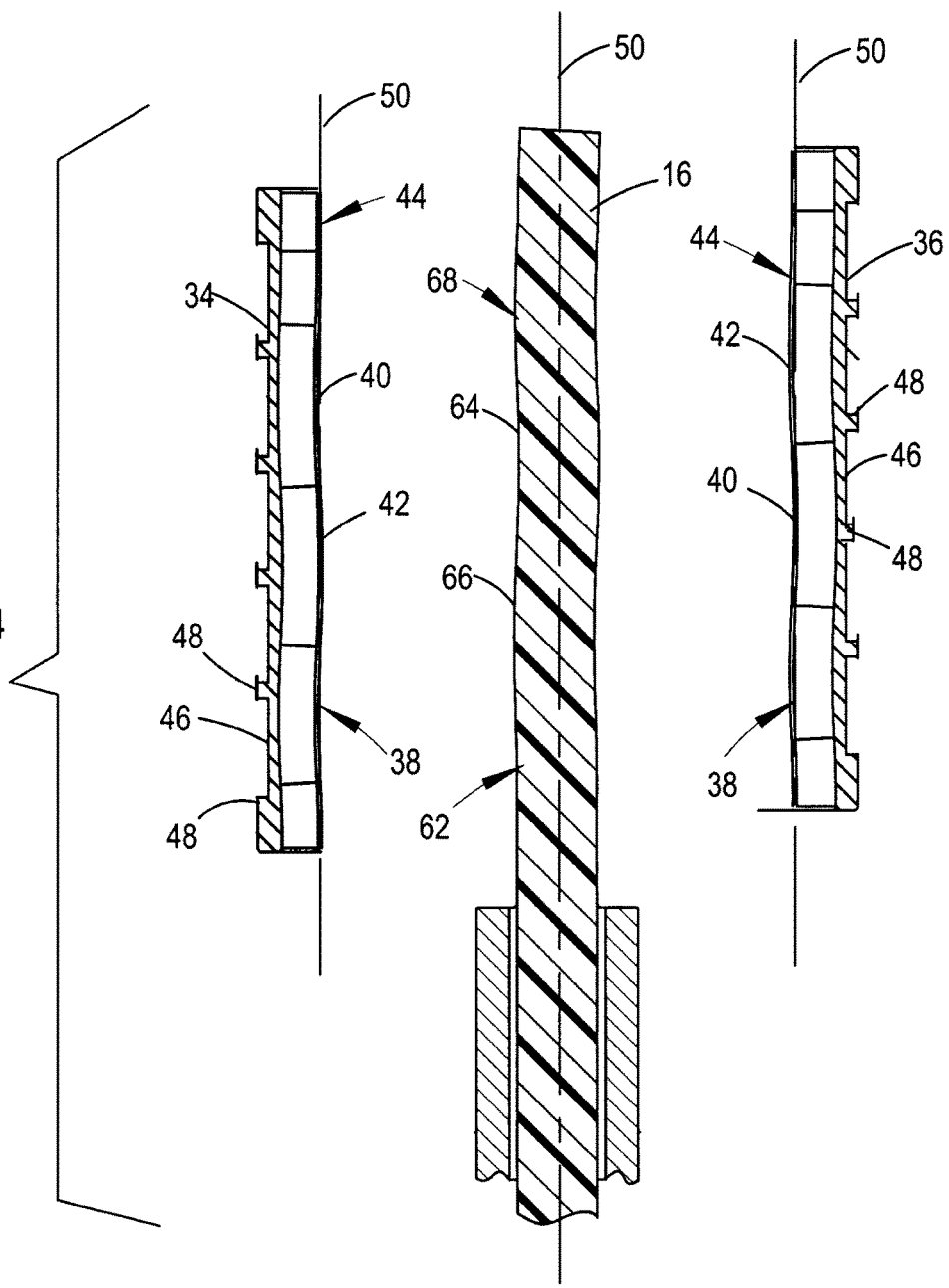
Figure 5:
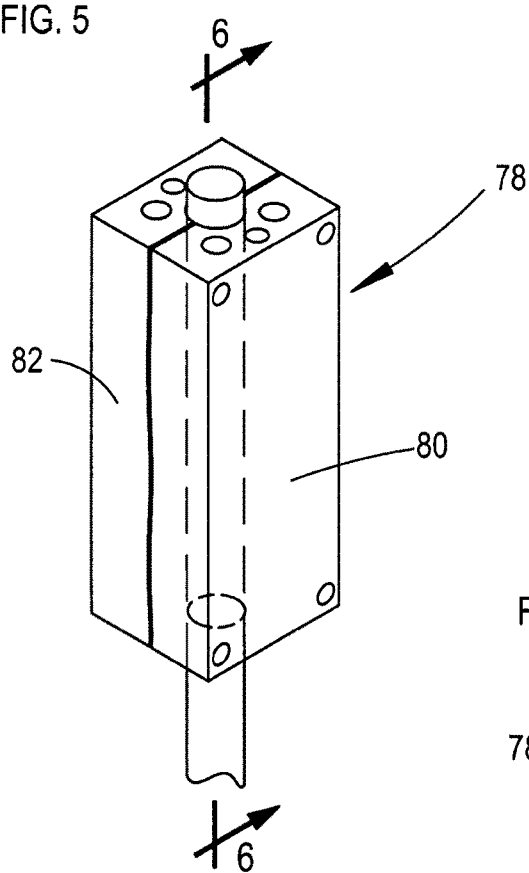

FIG. 4 is a partial longitudinal section view of the tension rod 16 of the composite sucker rod 12, taken along section line 2-2 of FIG. 1. The clamp members 34 and 36 have inwardly disposed surfaces with a profile 38 which has indentations 40 and protuberances 42. The terminal ends 22 of the tension rod 16 have exterior surfaces disposed in opposed relation to the interiorly disposed surfaces of the clamp members 34 and 36. The exterior surface of the terminal ends 22 have peripheries 62 which include indentations 64 and protuberances 66, which cooperatively engage with the indentations 40 and protuberances 42 of the profile 38 to secure the tension rod 16 between the clamp members 34 and 36. The indentations 40 and the protuberances 42 of the profile 38 and the indentations 64 and the protuberances 66 of the periphery 62 are preferably defined by arcuate surfaces of compound progressive radii. As shown in FIG. 5, the compound radii are disposed transverse to the longitudinal axis 50, and range from 8 to 16 inches radius.

Figure 6:
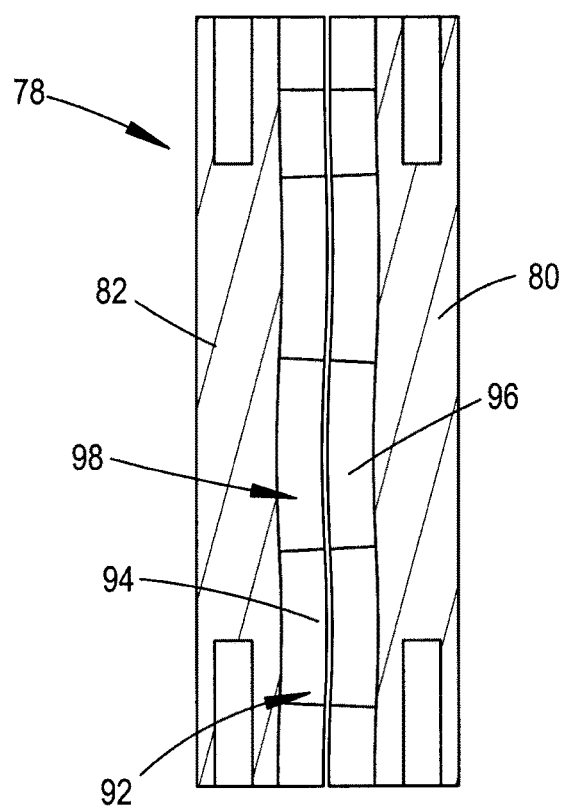

FIG. 5 is a perspective view of a die 78 for heat molding mounted to an end of the tension rod 16 of the composite sucker rod 12. FIG. 6 of is a longitudinal section view of the heat mold die 80, taken along section line 6-6 of FIG. 5. The die 80 has a first half 80 and a second half 82. Fastening bolt ports can be used clamping the first half 80 to the second half 82, holding the end of the tension rod under pressure. Heating element ports 88 are providing for receiving cartridge style heating elements. The die 78 has a primary aperture in which one of the terminal end sections 22 of the tension rod 16 are disposed, and then the terminal end section is heated into the glass transition temperature for the thermoset phenolic material from which it is made, briefly softening the resin for reshaping the ends of the tension rod. With the die halves 80 and 82 fastened together, the terminal end section 22 is molded to form the periphery 62 having compound progressive radii defined by indentations and protuberances 68 into the sides thereof, for gripping with the profile 38 of the clamping members 34 and 36. After the end fittings 14 are fully secured to the terminal end sections 22 of the tension rod 16, a final heat treatment post-bake for the sucker rod will be performed to fully cure the thermoset phenolic material of the tension rod 16 for optimal performance and temperature stability in the newly formed shape.

FIG. 7 is an exploded, longitudinal section view of an alternative support sleeve 108 with a centralizer 110 over molded onto the support sleeve 108. The support sleeve 108 has tube sections 112 and 114 which have full wall thicknesses for the full length of the tube sections 112 and 114, with a continuous OD and a continuous ID and a single, continuous wall thickness. The centralizer 110 is molded onto the section 114. Tubing couplings 116 have opposite facing sockets which have a press fit engagement with ends of the tube sections 112 and 114. An annular-shaped boss 118 extends into a central portion of the coupling 116, providing a stop for abutting terminal ends of respective ones of the tub sections 112 and 114.

FIG. 8 is an exploded, longitudinal section view of a second alternative support sleeve 124 with centralizer 126. The support sleeve 124 has end tubes 128 and an intermediate tube 132. The end tubes 128 have first ends with sockets 132 and the intermediate tubes 130 have reduced diameter ends 134 for fitting within the sockets 132.

Figure 9:
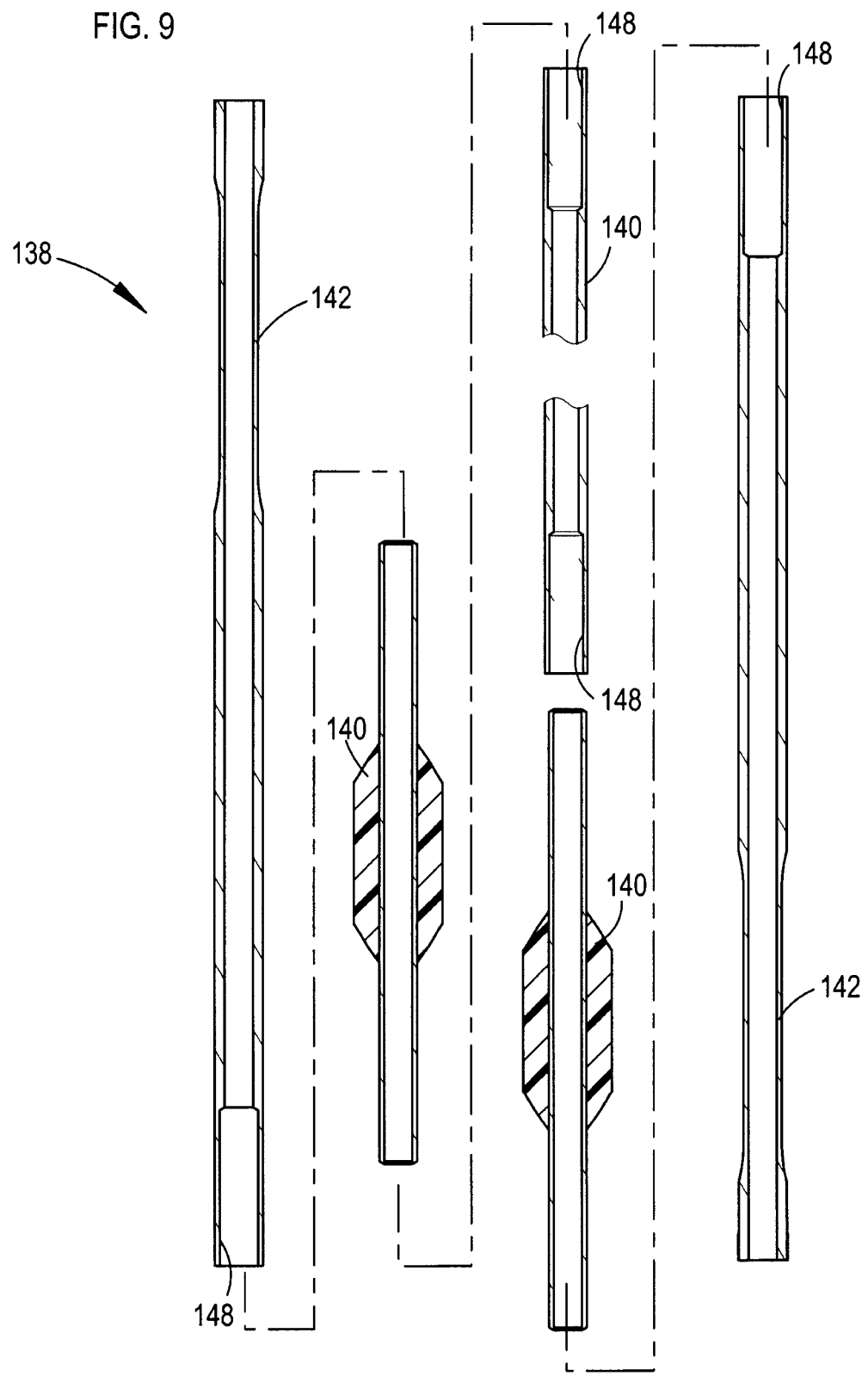

FIG. 9 is an exploded, partial longitudinal section view of a third alternative support sleeve 138 with centralizers 140. The support sleeve 138 has end sections 142 with necked down channels 142 for use with rod elevators at well sites, a lifting device, for handling and installing the rods into the well-bore. Rod guide sections 144 have the plastic centralizers 140 which are preferably molded onto the rod guide sections 144. Intermediate sections 146 extend between rod guide sections 144. Sockets 148 are formed on the ends of the intermediate sections and on one end of the end sections 142 for receiving the opposite ends of the rod guide sections 144.

With the present disclosure, the aluminum tubular structure is always in compression, and the carbon fiber tension rod is always in tension. This drastically increases the fatigue life of each component, rather than depending on a single stressed member to tolerate both compression and tension loads, creating a larger stress delta. This tube also acts as a protective component to the fiber.

Figure 10:
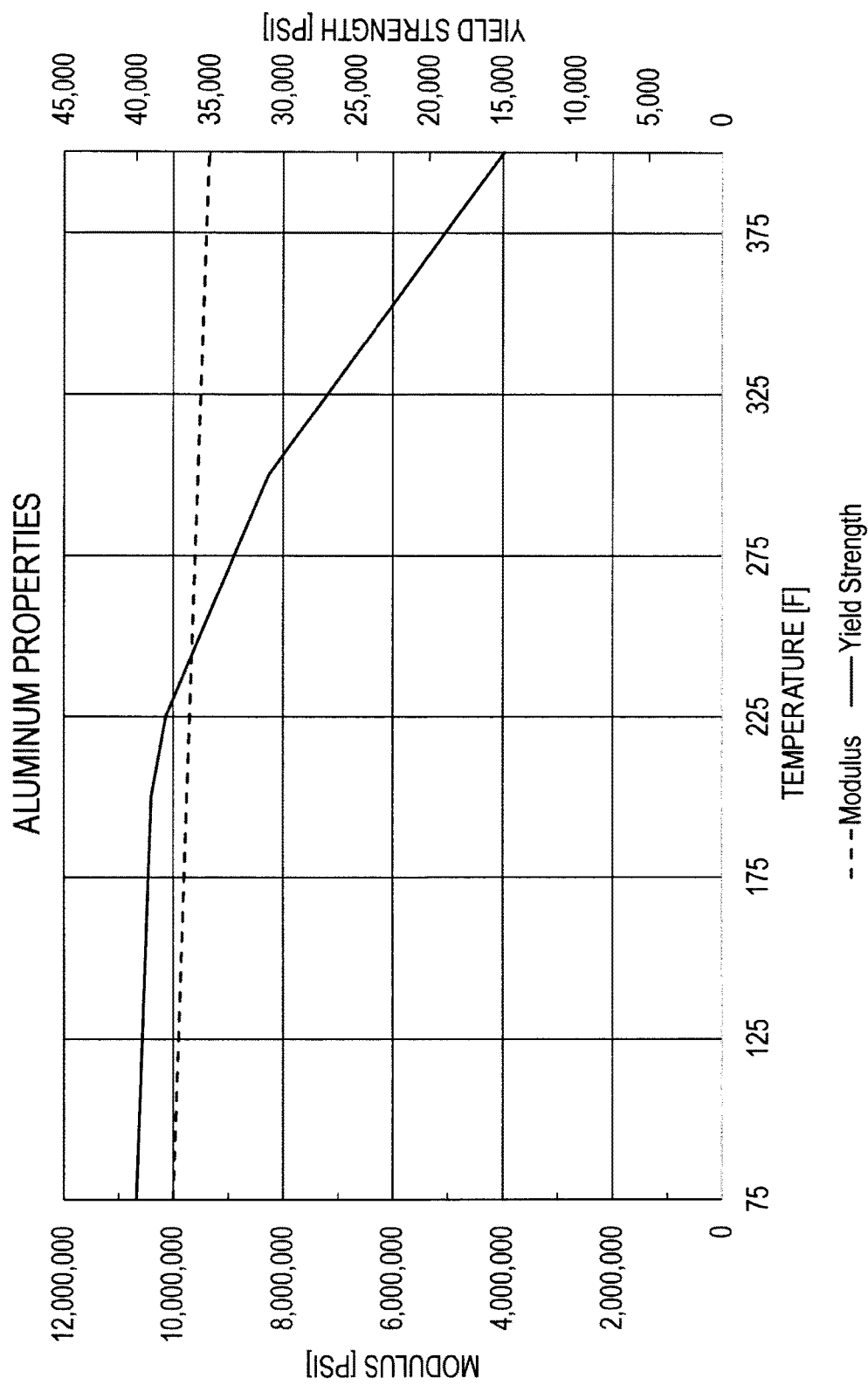
Figure 13:
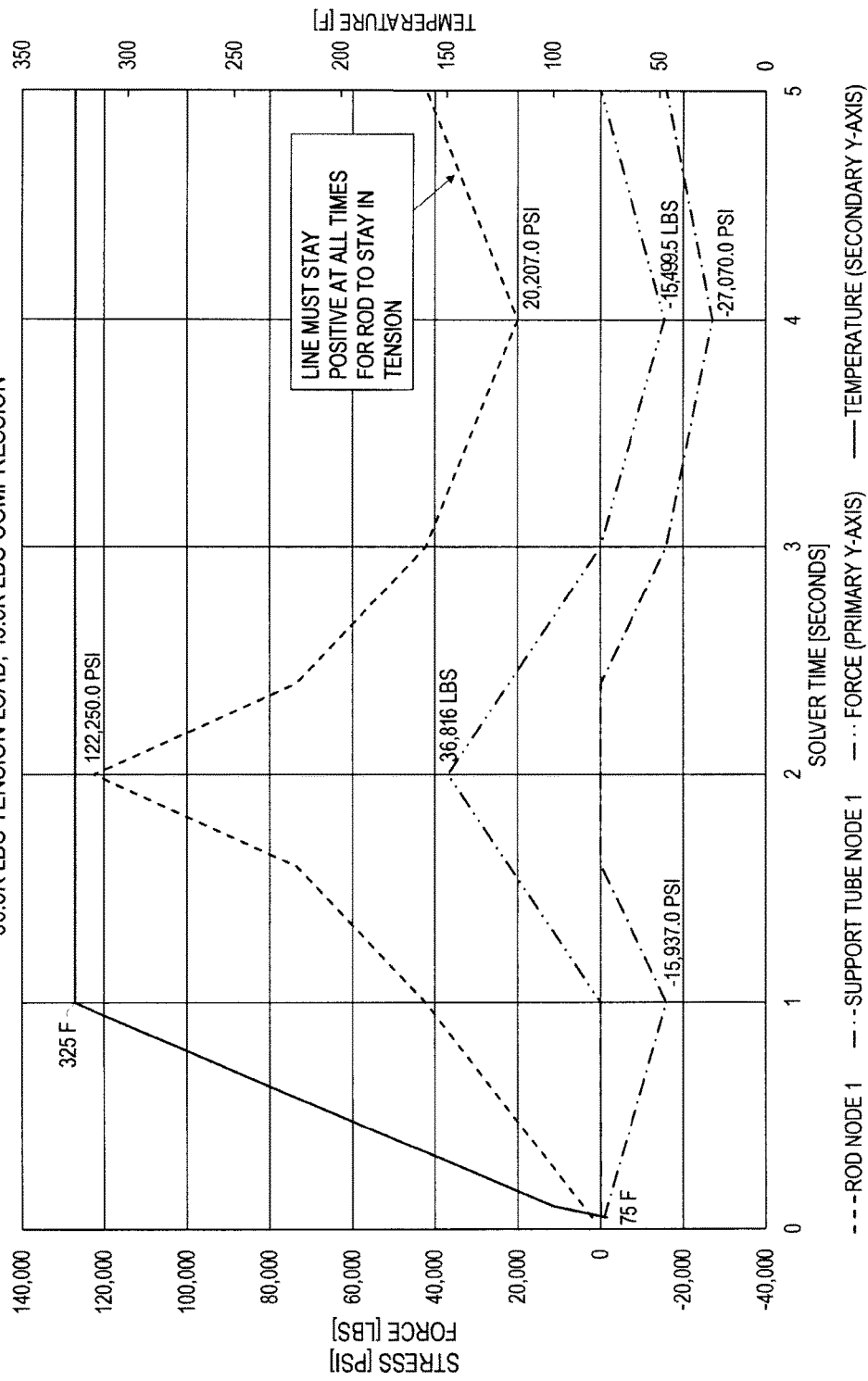
Figure 14:
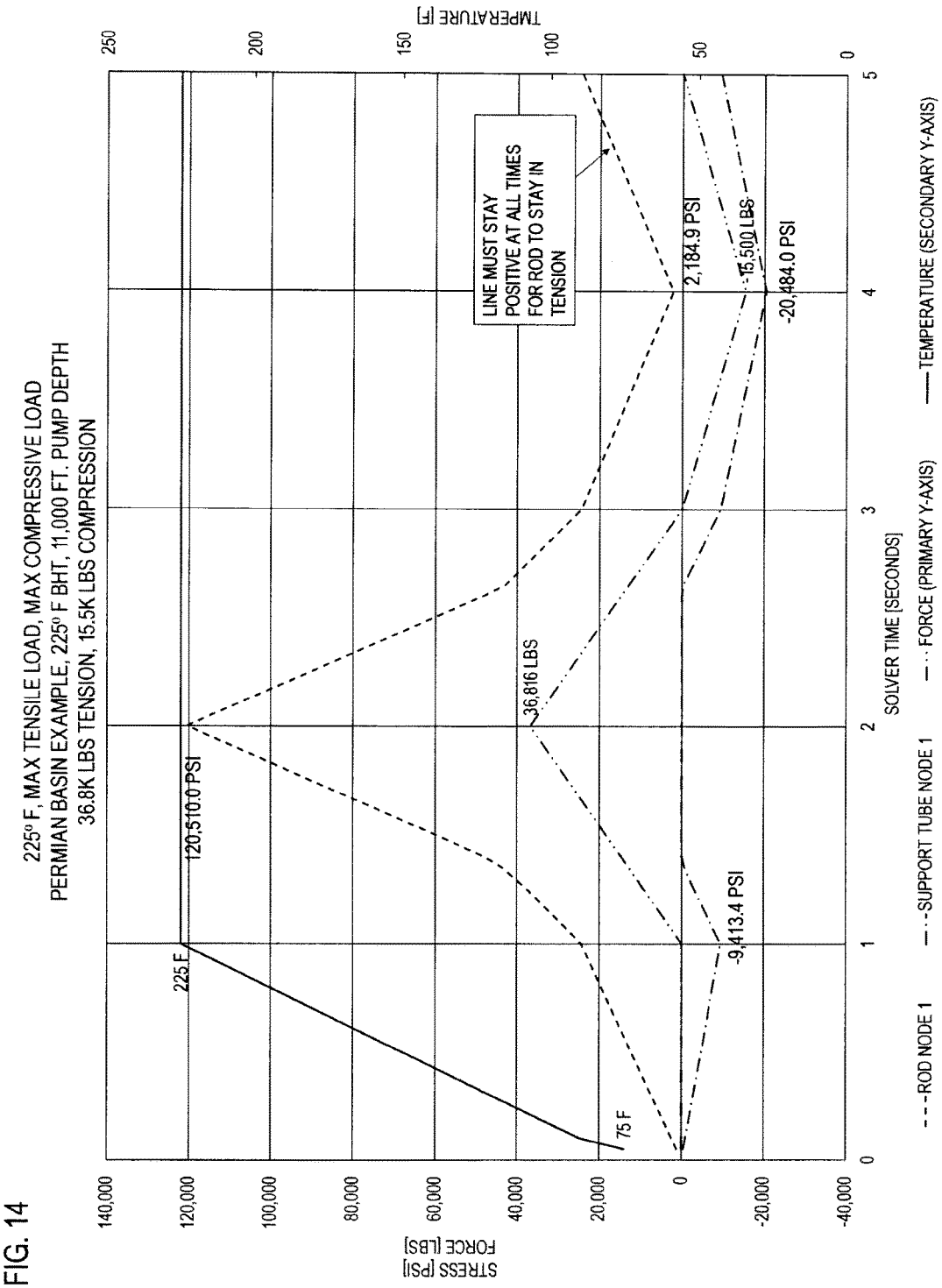

Under operations of installing the rod string on the well, if there is compression taking place, the thermal expansion puts the rod in enough tension to counter-act the compression, reducing the overall stress, though, the carbon fiber tension rod still remains in tension. Aluminum support tube was selected due to its strength at room and high temperature, its thermal expansion rates, and its overall weight and ease of use during manufacturing. It should be noted that at elevated temperatures, aluminum exhibits a loss in strengths. Although 7075 Aluminum is stronger at room temperature, its elevated temperature properties decline at an accelerated rate. 6061-T6 Aluminum retains the correct properties (both modulus and yield strength) at well-bore temperatures in order for the system to function correctly. A chart of this strength change is shown in FIG. 10. An example of its use in the Eagle Ford and Permian Basin is shown in FIG. 13 and FIG. 14, respectively.

The aluminum tubular structure could be of any profile, so long as the end cross sectional area is fully engaged with the end fitting. The sucker rod features a recess pocket in the end fitting, so that it is tucked in place and forced upon the central axis, centering itself on the ends, around the carbon fiber tension rod. The profile that has been elected for use maximizes manufacturability ease, cost, well-site use, and the proper AMOI for stiffness, as well as weight and cross-sectional area. At room temperature, on the surface, there is virtually no stress on the carbon fiber or the aluminum, as no thermal expansion has taken place so no growth of the respective members, therefore, no compression or tension loads with the associated aluminum profile or carbon fiber profile, is created.

To evaluate the stress on the carbon fiber pultrusion, and the aluminum compression tube, see the below math. The design is currently engineered for use with a ⅝" Carbon Fiber Pultrusion and a 1.250" O.D.×0.750" ID Aluminum Round Tubular profile.

Newton's Third Law:

Force Carbon Fiber Pultrusion = Force on Aluminum Support Tube

Calculations

Force = (stress)(area)

$(Stress_{AL})(Area_{AL}) = (Stress_{CF})(Area_{CF})$ $Area_{CF} = \pi r^2 = \pi\left(\frac{0.625}{2}\right)^2 = \pi(0.3125)^2 = \sim 0.3068 \text{ in}^2$ $Area_{AL} = \pi r_{OD}^2 - \pi r_{ID}^2 =$ $\pi\left(\frac{1.250}{2}\right)^2 - \pi\left(\frac{0.750}{2}\right)^2 = \pi(0.6125)^2 - \pi(0.375)^2 = 0.78540 \text{ in}^2$ Solving for the Stress on the Aluminum Structure:

$(Stress_{AL}) =$ $\frac{(Stress_{CF})(Area_{CF})}{(Area_{AL})} = \frac{(Stress_{CF})(0.3068)}{(0.78540)} = (0.3906)(Stress_{CF})$ That is, the stress on the aluminum, from thermal expansion, will be roughly ²⁹⁄₆₄ths that of the stress put on the carbon fiber rod.

Assuming the rod was assembled at 75 degrees F., theoretical stresses can be evaluated on each component at 225° F. well temperature, a ΔT of 150° F.

Modulus, $E_{CF} = 19,500,000$ psi

Modulus, $E_{AL@225F} = 9,700,000$ psi

Thermal Expansion Coefficient, $\alpha_{CF} = -0.0000015$

Thermal Expansion Coefficient, $\alpha_{AL} = 0.0000135$

Length of $CF$ and $AL = 440$ inches

Extension of Carbon Fiber Pultrusion +

Compression of Aluminum Support Tube =

Difference in Free Lengths $\frac{(Stress_{AL})(Length_{AL})}{E_{AL}} + \frac{(Stress_{CF})(Length_{CF})}{E_{CF}} = (\alpha_{AL} - \alpha_{CF})(\Delta T)(L)$ $\frac{(0.3096)(Stress_{CF})(440)}{9,700,000} + \frac{(Stress_{CF})(440)}{19,500,000} =$ $(0.0000135 - (-0.0000015))(150)(440)$ Cross-Multiply & Simplified $\frac{(3,351,478,000)(Stress_{CF})}{189.15 * 10^{12}} + \frac{(4,268,000,000)(Stress_{CF})}{189.15 * 10^{12}} = 0.99$ $(Stress_{CF})\frac{(4,338,478,000) + (4,268,000,000)}{189.15 * 10^{12}} = 0.99$ $(Stress_{CF})\frac{(7,619,348,000)}{189.15 * 10^{12}} = 0.99$ $$(\text{Stress}_{CF}) = \frac{(0.99)(189.15 * 10^{12})}{(7,619,348,000)}$$

$$(\text{Thermal Stress}_{CF}) = 24,576.7 \text{ psi}$$

Now, solving for stress on the Aluminum Component, which is in compression.

$$(\text{Stress}_{AL}) = (0.3891)(\text{Stress}_{CF})(-1_{compression})$$

$$(\text{Stress}_{AL}) = (0.3891)(24,576.7 \text{ psi})(-1_{compression})$$

$$\text{Thermal Stress}_{AL} = -9,579 \text{ psi}$$

The aluminum is forced into compression from the thermal expansion and strain, stressing the cross-sectional area at −9,579 psi. The carbon fiber, because it is being pushed on, by the expanding aluminum, is being stressed on its cross-sectional area, at about 23,855.5 psi. This pre-stress on the assembly is created purely from thermal expansion at 150° F. over the assembly temperature. This is the minimum stress the CF assembly will see at all times, at the +150° F. temperature over ambient assembly temperature.

A safe, allowable max tensile stress on the carbon fiber rod, is about 120,000 psi. As a load is put on the carbon fiber rod, it will transfer strain driver from the thermal expansion of the aluminum tube, to the tensile load from the rod string and fluid column load on the plunger of the down-hole pump. Thus, the max load allowed on the carbon fiber phenolic tension rod can be calculated at a temperature of 150 F over assembly temperature, approximately 225 F downhole temperature, is:

$$\text{Max Tensile Stress}_{CF} = 120,000$$

The reason the peak working stress does not change for the tension rod is due to a transfer of theoretical load (thermal expansion force on tensile assembly) from the thermal expansion on the end fitting and thus the carbon fiber pultrusion, to the actual sucker rod lifting load. As the rod is loaded synonymous with the up-stroke of the surface pump jack, it will eventually strain (stretch) and walk off-of the aluminum support structure, which then relieves the compressive stress on the aluminum support structure. Regardless of assembly temperature, working temperature, and thermal expansion preload exerted on the carbon fiber tension rod, this pre-load stress is NOT added in addition to the tension loading from lifting the weight of other sucker rod assemblies below the rod or the weight of the plunger and the fluid column.

Figure 11:
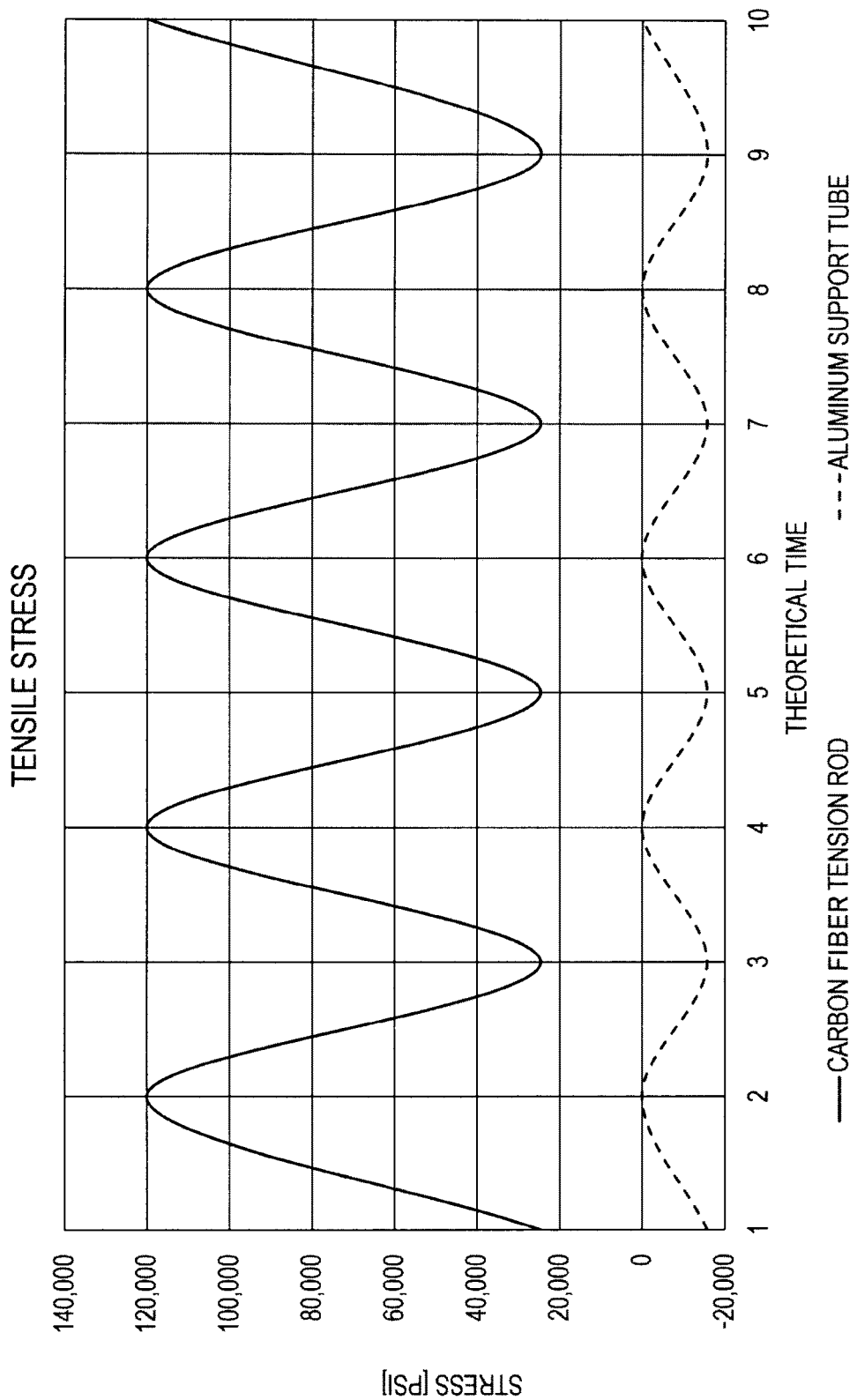

FIG. 11 is a generalized chart displaying stress cycles for the assembly. The dataset cycling between roughly +23,855 psi and +120,000 psi is the tensile stresses that the carbon fiber tension rod are subject to. The lower dataset is the compressive cyclic stresses for the aluminum support tube. Anything below 0 psi would be compression on the carbon fiber rod. Anything above 0 psi would be tension loading on the aluminum support tube.

Converting this 120,000 psi stress into a load:

$$\text{Tensile Load} = (120,000 \text{ psi})(0.3068 \text{ in}^2)$$

$$\text{Max Tensile Load} = 36,816 \text{ lbs}$$

There is an abundance of available load and stress for the carbon fiber sucker rod to safely operate in application. The sucker rod at this temperature (225 F, +150 F over ambient temperature), is operating in a full fluid column, and will need to carry the buoyant weight of the rod itself, the buoyant weight of the rods below it, and the full weight of the plunger and fluid column for the well.

Wells produce oil and water mixture. Water, denser than oil, is heavier, and has a fluid density of approximately 0.03613 lbs/in$^3$. One of the largest down-hole pump plunger diameters for use in 2⅞ inch wells is 2.25 inch in diameter. The fluid load per foot for this plunger diameter is calculated below:

Fluid Load per Foot =

$$(\pi r_{plunger}^2)(12)(0.03613) = \pi\left(\frac{2.250}{2}\right)^2(12)(0.03613) =$$

$$\pi(1.125)^2(12)(0.03613) = (3.9761)(12)(0.03613) = 1.724 \text{ lbs/ft}$$

The proposed sucker rod, with the end fittings, pins, aluminum tubes, centralizers (to prevent direct contact between rod reciprocation and tubing I.D., and phenolic resin system, averages to approximately 1.47 pounds per foot. Recall, the rod has to be able to support itself, the rods below it, and the full fluid column. The buoyant weight of the assembly can be calculated from volume of fluid displacement, which is equal to the force exerted by the fluid on the assembly, offsetting the weight in air of the assembly. In 0.85 specific gravity fluid mixture, the rod assemblies functionally realized weight for the pumpjack is approximately 0.989 pounds per foot.

The shallowest depth subsurface featuring a down-hole temperature of about 225 F, 150 F above assembly temperature, is approximately 5,000 feet (Eagle Ford).

Wellbore Tensile Load =

$$(\text{Pump Depth})\left(1.724\frac{\text{lbs}}{\text{ft}}\right) + (\text{Pump Depth} - 5,000)\left(0.989\frac{\text{lbs}}{\text{ft}}\right)$$

$$36,684.4 \text{ lbs} = (\text{Pump Depth})\left(1.724\frac{\text{lbs}}{\text{ft}}\right) +$$

$$(\text{Pump Depth} - 5,000)\left(0.989\frac{\text{lbs}}{\text{ft}}\right)$$

$$36,684 \text{ lbs} = (\text{Pump Depth})\left(1.724\frac{\text{lbs}}{\text{ft}}\right) +$$

$$(\text{Pump Depth})\left(0.989\frac{\text{lbs}}{\text{ft}}\right) - 4,945$$

$$36,668.4 + 4,945 = (\text{Pump Depth})(2.713)$$

$$\frac{41,613.4}{2.713} = \text{Pump Depth}$$

$$15,338.5 \text{ feet} = \text{Pump Depth}$$

$$\text{Max Pump Depth} = 15,338.5 \text{ feet}$$

The rod body would be at peak stress (120,000 psi), pumping a 2.25" tubing pump and the buoyant weight of the rod string, at 15,338 feet.

The assembly will behave very closely to this calculated math so long as the carbon fiber tension rod is kept in tension at all times, which is a requirement for the system to work. In order to validate this, the aluminum needs to be evaluated, providing assurance that it will take the compressive loads and create the appropriate thermal stresses and loads required to keep the carbon fiber component in tension as it goes deeper into the well.

Recall, the thermal stress induced on the aluminum tube, at 150 F above assembly temperature, is the following:

Thermal Stress$_{AL}$=−9,579 psi

Compressive loads are created on the down-stroke of the pumping system. This is due to something become stuck or resisting falling, therefore, the maximum compressive load on a rod would be the buoyant weight of all of the rods above the rod being evaluated, as that is the down-acting compressive load applied to the component, as well as the inertia of the system and its velocity traveling through the production tubing. The inertia-based loading has been ignored for simplicity, as each well will operate under different conditions. Recall, the compressive load will be distributed proportionally across the system. This applies only to thermal stress or compressive stresses and loads, as the tube, end fitting, and thus the carbon fiber tension rod pultrusion, are all treated as bonded. In tension, the carbon fiber tension rod and end fitting stretches beyond the free length of the aluminum support structure, so no tensile stress is applied to the aluminum support structure; the stress realized by the aluminum support is 0 psi.

Aluminum properties are non-linear, meaning, as aluminum is heated, it becomes a bit more pliable (modulus reduction) and its ultimate strengths decrease. Fatigue of aluminum is also a discussion point for this assembly. Tensile fatigue of aluminum is lacking, however, compression fatigue of aluminum, if always kept in compression, is approximately ten to one-hundred times that of aluminum in tension.

For instance, 6061-T651 aluminum, DOM extrusion, features properties at the temperatures shown in the following TABLE A

TABLE A

| Temperature | Aluminum Modulus, psi | Yield Strength, psi |
|---|---|---|
| 75 | 10,000,000 | 40,000 |
| 100 | 9,950,000 | 39,800 |
| 125 | 9,900,000 | 39,600 |
| 150 | 9,850,000 | 39,400 |
| 175 | 9,800,000 | 39,200 |
| 200 | 9,750,000 | 39,000 |
| 225 | 9,700,000 | 38,000 |
| 250 | 9,650,000 | 35,675 |
| 275 | 9,600,000 | 33,350 |
| 300 | 9,550,000 | 31,000 |
| 325 | 9,500,000 | 26,975 |
| 350 | 9,450,000 | 22,950 |
| 375 | 9,400,000 | 18,925 |
| 400 | 9,350,000 | 14,900 |

For the evaluation, 38,000 psi is the MAXIMUM stress the aluminum can handle before yielding. This value is selected from tensile properties.

Max Compressive Stress$_{AL}$=(−38,000)−Thermal Stress$_{AL}$

Max Compressive Stress$_{AL}$=(−38,000)−(−9579 psi)

Max Compressive Stress$_{AL}$=−28,401 psi

Converting this into a load which is shared with the carbon fiber tension rod pultrusion assembly (recall the Stress Ratio):

Compressive Load=(−28,401 psi)(0.78540 in$^2$)

Max Compressive Load$_{AL}$=−22,306.15 lbs

Above is the maximum compressive load the aluminum support structure can take, BUT, the load is shared with the carbon fiber, per Mechanics of Materials and composite structures. This means a load on the entire system, can be had. Backing in to the overall tag load for the system, and then seeing what compressive load is applied to the carbon fiber pultrusion and the aluminum support structure, independently:

$$\text{Stress} = \frac{\text{Force}}{\text{Area}}$$

$(\text{Stress}_{AL}) = (0.3906)(\text{Stress}_{CF})$ $(-28,401 \text{ psi}) = (0.3906)(\text{Stress}_{CF})$ $\frac{-28,401 \text{ psi}}{0.3906} = \text{Stress}_{CF}$ $\text{Stress}_{CF} = -72,762.4 \text{ psi}$ Above, the limit of the system has been breached. The shared stress on the carbon fiber at full compressive stress on the aluminum (yield), would put the carbon fiber into compression. The maximum tag load for the system at 150° F. over assembly temperature, 225° F., and the proportionate load on the carbon fiber, is calculated below. The max compressive stress on the carbon fiber pultrusion cannot exceed the tensile stress put on the sucker rod from the tubing structure.

(Thermal Stress$_{CF}$) = 24,576.7 psi

Maximum Compressive Stress (proportionate) = −24,576.6 psi $$\text{Tag Stress}_{CF} = \frac{\text{Force}_{CF}}{\text{Area}_{CF}}$$

$$-24,576.7 \text{ psi} = \frac{\text{Force}_{CF}}{0.3068 \text{ in}^2}$$

Force$_{CF}$ = (−24,576.7 psi)(0.3068 in$^2$)

Force$_{CF}$ = −7,540.13 lbs

The most negative load allowed to be applied to the carbon fiber tension rod, before the rod completely retreats from being in tension and reverses to true compression, is 7,540.13 lbs. Now, backing into the total force allowed on the system, since the compressive stress is shared between the carbon fiber pultrusion and the aluminum support structure:

Force$_{CF}$ = −7,570.13 lbs $$\text{System Compressive Force} = \frac{\text{Force}_{CF}}{1 - 0.3906}$$

$$\text{System Compressive Force} = \frac{\text{Force}_{AL}}{0.3906}$$

$$\text{System Compressive Force} = \frac{\text{Force}_{CF}}{0.6094}$$

$$\text{System Compressive Force} = \frac{-7,540.13 \text{ lbs}}{0.6094}$$

System Compressive Force = 12,373 lbs

The maximum number of rods inducing a 100% compressive load, with no movement of the rod in question, as if it is fully seized, at any given point in the rod string that features temperatures of 150° F. above assembly temperature, is calculated below. NOTE: the below calculation excludes buoyancy effect on rod weight, meaning, this is conservative.

Rod System Weight/Foot = 1.47 lbs/ft $$\text{Max Feet of Rods Above Rod}_{Assem+150F} = \frac{(12{,}373 \text{ lbs})}{1.47 \text{ lbs/ft}}$$

Max Feet of Rods Above Rod$_{Assem+150F}$ = 8,417 feet

Doing the same evaluation with Buoyant Rod Weight, the following is calculated:

Buoyant Rod System Weight/Foot = 0.989 lbs/ft $$\text{Max Feet of Rods Above Rod}_{Assem+150F} = \frac{(12{,}373 \text{ lbs})}{0.989 \text{ lbs/ft}}$$

Max Feet of Rods Above Rod$_{Assem+150F}$ = 12,510.62 feet

At the thermal expansion rate, temperature, and weight of the assembled rod, the aluminum could handle 8,417 feet of sucker rod coming down on it, prior to the carbon fiber being put into compression, with no buoyancy effects. The Permian Basin currently has wells which are 11,000 feet in depth with a temperature of about 210° F. More thermal stress needs to be induced on the assembly to support the full weight of the rod string without fluid inclusive of a generous safety factor. Adjusting for buoyancy affects, however, and the system is safe, allowing for 12,510 feet of compressive load. For greater safety factor, this requires an offset of tubular profile to reduce the thermal stresses pre-disposed to the aluminum support shell, which is very easy to do.

The aluminum tubing can handle the compressive load of the entire string, no issue, and not yield, so long as it is held stable and there is no buckling action. One now must evaluate the viability of a long slender column, a single rod, being put into compression, and buckling. To evaluate this, Euler's Column Buckling Formula is used. Note: the below is assuming that the assembly is built with one continuous tube structure of 1.250" OD and 0.750" ID. This design works well and is easy to work with in manufacturing, and has been elected over a design with small sections co-joined.

Figure 12:
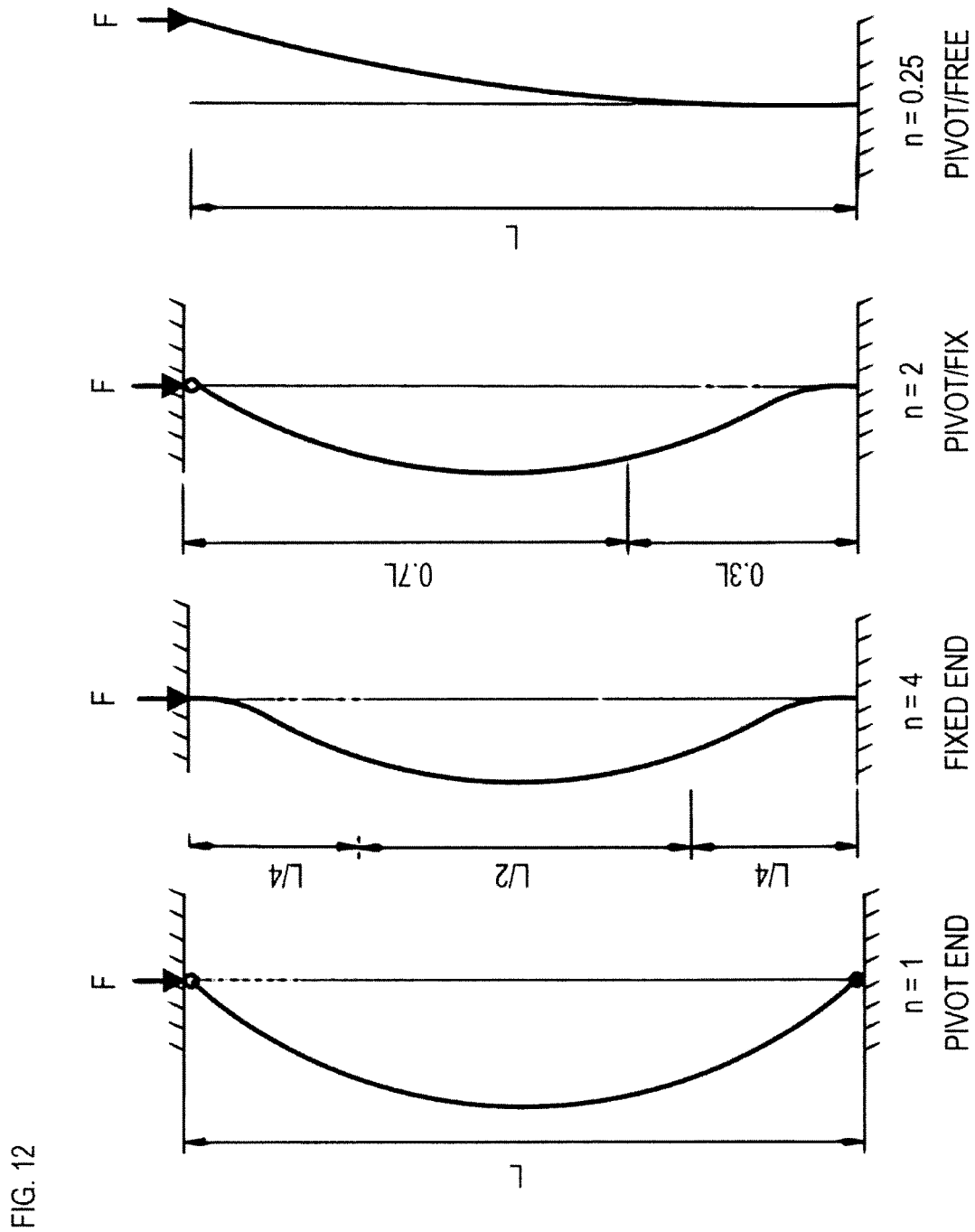

FIG. 12 shows Euler Column End modes for evaluation.

$E$ = modulus of elasticity (psi)

$I$ = moment of intertia (in$^4$) = $\frac{\pi D^4}{64}$ $L$ = length of tube (inches)

$F$ = load (lbs)

$n$ = boundary condition

Euler's Column Formula:

$$F = \frac{n\pi^2 EI}{L^2}$$

The boundary condition for our application, due to the design of the aluminum tube being tucked into a recess of the end fitting, is selected as n=4. The assembly is treated as fixed ends.

Now, for the selected geometry, which is 1.250" OD and 0.750" ID, this results in a calculation of AMOI, Area Moment of Inertia, as follows:

$$AMOI = \text{moment of intertia (in}^4) = \frac{\pi OD^4}{64} - \frac{\pi ID^4}{64}$$

$$AMOI = \frac{\pi 1.250^4}{64} - \frac{\pi 0.750^4}{64}$$

$AMOI = 0.11984 \text{ in}^4 - 0.01553 \text{ in}^4$ $AMOI = 0.10431 \text{ in}^4$ Proceeding to calculate the maximum load of a section prior to buckling, based on the above AMOI, the modulus of elasticity at 150° F. above assembly temperature, and the free tube length of 440 inches.

$F$ = load (lbs)

$E$ = modulus of elasticity (psi) = 9,700,000 psi $I$ = moment of intertia (in$^4$) = 0.10431 in$^4$ $L$ = length of tube (inches) = 440 in.

$n$ = boundary condition = 4

$$F = \frac{n\pi^2 EI}{L^2}$$

$$\text{Compressive Force (load)} = \frac{4\pi^2(9{,}700{,}000)(0.10431)}{440^2}$$

$$\text{Compressive Force (load)} = \frac{39{,}944{,}539.28}{193{,}600}$$

Compressive Force (load) = 206.3 lbs 206 lbs of compressive load is unacceptable, as it is less than our max allowable compressive force, meaning the assembly would buckle, be unstable in compression and ultimately fail due to stress concentrations from buckling. Furthermore, the buckling assembly increases side-loads substantially and accelerates guide, rod, and tubing wear, all the while reducing effective plunger stroke, decreasing pumping efficiency tremendously. To prevent this and increase our critical buckling load, sucker rod guides or sucker rod centralizers are used.

Evaluating the max compressive load calculated, before yield, allows for backing into what the centralized free length sections need to be prior to being supported again. This would relate to the maximum gaps of free aluminum tube length between sucker rod centralizers. Recall the max compressive load was calculated at 150 F beyond assembly temperature.

Max Compressive Load$_{AL}$ = $F$ = −22,373 lbs $$F = \frac{n\pi^2 EI}{L^2}$$

Rearranged for Solving for Length:

$$\text{Length} = \sqrt{\frac{n\pi^2 EI}{\text{Force}}}$$

$$\text{Length} = \sqrt{\frac{4\pi^2(9{,}700{,}000 \text{ psi})(0.10431)}{22{,}373 \text{ lbs}}}$$

$$\text{Length} = \sqrt{\frac{39,944,539.28}{22,373 \text{ lbs}}}$$

$$\text{Length} = \sqrt{1,783.9}$$

Maximum Free Span Length, Prior to Buckling:

Length=56.819 inches

The original design, and weight per foot of the assembly, is based on 10 guides per rod along the aluminum section. The centralizers are approximately 5.500" in over-all length. The aluminum is supported and tucked inside of the end fittings, on each end. Quick math can tell us how much bare aluminum is exposed and not stabilized.

Free aluminum length=440"−($N_{guides}$)(5.500)−(0.750) (2)

Free aluminum length=440"−(10)(5.500)−(0.750)(2)

Free aluminum length=383.5"

With ten guides per rod, plus supports from the ends, this creates eleven free span gaps ($N_{guides}$+1).

$$\text{Free aluminum length between supports} = \frac{383.5''}{(N_{guides}+1)}$$

$$\text{Free aluminum length between supports} = \frac{383.5''}{(10+1)}$$

Free aluminum length between supports = 34.864"

Therefore, with new rod guides, the rod string will not buckle under compressive loads, all the way up to yield strength of the aluminum support structure, which would be applying a compressive load to the carbon fiber pultrusion, a highly conservative evaluation. To create 12,373 lbs of compression in the well, it would require 12,510 feet of sucker rod above the rod being evaluated. The analysis set forth herein features 5,000 feet of this sucker rod above our point of evaluation, which is 225° F., driven by an aggressive thermal gradient in the Eagle Ford, assumed linear from surface to bottom of well. If the assembly described herein were to be utilized in the Permian Basin, the well could feature 11,000 feet of rod load above the lowest rod, at the highest temperature, which features the weakest aluminum support structure under the most compressive stress, and still function correctly.

Charts evaluating the dynamic properties of the aluminum structure at different load and thermal gradients are attached in the Figures. The math changes for each temperature due to the aluminum modulus reduction, along with new stress limits.

There is an assumption here that the rod string will not buckle, even if it under its own entire weight, and also not yield. At 300° F. and higher if there is absolutely zero movement of the rod string, the string will not buckle, but the pre-stress on the carbon fiber could be compromised due to yielding of the aluminum from excessive load. This would void warranty of the product, as it should not be put in excessive compression. There is a reduced strength of aluminum at higher temperature. For temperatures above 300° F., it is advised to offset the aluminum tube length by approximately 0.750" at room temperature so that less compressive stress is induced to the assembly from thermal expansion. This will gain overall temperature resistance to the well-bore (up to 350° F. with aluminum).

As can be seen, our assembly will not buckle under compressive loads, will support the required tensile loads and protects the carbon fiber at all times, always keeping it in tension, up to 300° F. Offset the aluminum structure, this becomes 350° F. Even at degradation of the resin matrix for the carbon fiber, there is no compression induced to the fiber due to the fibers being held in tension at all times.

The last and final evaluation of the assembly, to validate that the multi-component assembly can work in wells, is by evaluating Bending Stiffness. This is a combination of AMOI (Area Moment of Inertia) and Modulus of Elasticity.

To work, the composite sucker rod (aluminum tube and carbon fiber rod) must have a lower bending stiffness value than production tubing, meaning it can pass through the production tubing and its deviation without issue.

Composite Sucker Rod:

$$\text{Bending Stiffness} = \text{moment of intertia (in}^4) * E = \left(\frac{\pi OD^4}{64} - \frac{\pi ID^4}{64}\right)(E)_{Aluminum} + \left(\frac{\pi D^4}{64}\right)(E)_{CF}$$

$$\text{Bending Stiffness} = \left(\frac{\pi 1.250^4}{64} - \frac{\pi 0.750^4}{64}\right)(9,700,000) + \left(\frac{\pi (0.625)^4}{64}\right)(19,500,000)$$

Bending Stiffness = (0.11984 in$^4$ − 0.01553 in$^4$)(9,700,000) + (0.00749)(19,500,000)

Bending Stiffness = 1,157,865 in$^4$psi

2⅞" Tubing:

$$\text{Bending Stiffness} = \text{moment of intertia (in}^4) * E = \left(\frac{\pi OD^4}{64} - \frac{\pi ID^4}{64}\right)(E)_{Steel}$$

$$\text{Bending Stiffness} = \left(\frac{\pi 2.875^4}{64} - \frac{\pi 2.441^4}{64}\right)(29,700,000)$$

Bending Stiffness = (3.354 in$^4$ − 1.753 in$^4$)(29,700,000)

Bending Stiffness = 47,843,840 in$^4$psi

2⅜" Tubing:

$$\text{Bending Stiffness} = \text{moment of intertia (in}^4) * E = \left(\frac{\pi OD^4}{64} - \frac{\pi ID^4}{64}\right)(E)_{Steel}$$

$$\text{Bending Stiffness} = \left(\frac{\pi 2.375^4}{64} - \frac{\pi 1.905^4}{64}\right)(29,700,000)$$

Bending Stiffness = (3.354 in$^4$ − 1.753 in$^4$)(29,700,000)

Bending Stiffness = 27,185,124 in$^4$psi

As can be seen above, the sucker rod is much more flexible than a joint of tubing by a factor of twenty-three to forty-one times, therefore, it will easily pass through tubing and deviation. In application, the rod assemblies co-joined with traditional sucker rod couplings will snake through the well-bore deviation and production tubing with ease.

The engineering concepts above have been validated with Finite Element Analysis for different assembly examples, true to real loads and applications in both the Eagle Ford production region of the United States as well as the Permian Basin. The application results can be found in FIGS. 13 and 14, respectively.

Thus the advantages of this invention provides a composite sucker rod with a continuous outer support sleeve which is pre-loaded in compression, which pre-loads a continuous composite rod in tension. Pre-loading the composite sucker rods in tension prevents failure caused by compressive loads.

Although the preferred embodiment has been described in detail, it should be understood that various changes, substitutions and alterations can be made therein without departing from the spirit and scope of the invention as defined by the appended claims.

What is claimed is:

1. A composite sucker rod having a first end and a second end, the composite sucker rod comprising:
    a first fitting disposed on said first end for operatively connecting the composite sucker rod to a first adjacent member;
    a second fitting disposed on said second end for operatively connecting the composite sucker rod to a second adjacent member;
    a tension rod formed of carbon fiber reinforced composite material extending between and secured to said first fitting and said second fitting for transmitting power forces there-between;
    a support sleeve formed of aluminum extending between said first fitting and said second fitting for applying tensile forces there-between and to said tension rod;
    wherein said composite sucker rod is operated at downhole operating temperatures which exceed ambient atmospheric temperatures located above a ground surface, and said tension rod formed of carbon fiber reinforced composite material and said support sleeve formed of aluminum have different coefficients of thermal expansion such that, in traveling from ambient atmospheric temperatures above the ground surface to downhole operating temperatures, compressive preloads are applied to said support sleeve and corresponding tensile preloads are applied to said tension rod; and
    wherein said tensile preloads oppose compressive operating loads applied across the composite sucker rod and thereby reduces compressive loads applied to said tension rod, maintaining said tension rod in tension.

2. The composite sucker rod according to claim 1, wherein at the ambient atmospheric temperatures located above the ground surface, said compressive preloads and said corresponding tensile preloads are not applied to respective ones of said support sleeve and said tension rod.

3. The composite sucker rod according to claim 1, wherein said support sleeve is a continuous tubular sleeve which extends around said tension rod, from said first fitting to said second fitting.

4. The composite sucker rod according to claim 3, wherein said first fitting and said second fitting each have recesses in opposed relative relation which define annular-shaped pockets for receiving opposite ends of said compression sleeve.

5. The composite sucker rod according to claim 3, wherein said support sleeve defines a continuous tubular sleeve which extends around said tension rod, from said first fitting to said second fitting.

6. The composite sucker rod according to claim 5, wherein said tension rod is formed of a composite thermoset material.

7. The composite sucker rod according to claim 6, wherein said composite thermoset material of said tension rod is formed of a fiber reinforced phenolic material.

8. The composite sucker rod according to claim 6, wherein said first fitting and said second fitting each have clamping members, and wherein opposite terminal end sections of said tension rod have exterior peripheries which are formed to define compound progressive indentions which fit in cooperative relation with formed surfaces of said clamping members to retain said terminal end sections within respective ones of said first fitting and said second fitting.

9. A composite sucker rod having a first end and a second end for connecting in a sucker rod string to power a downhole pump, the composite sucker rod comprising:
    a first fitting disposed on said first end for operatively connecting the composite sucker rod to a first adjacent member;
    a second fitting disposed on said second end for operatively connecting the composite sucker rod to a second adjacent member;
    a tension rod formed of a fiber reinforced composite plastic material, said tension rod extending between and secured to said first fitting and said second fitting for transmitting power forces there-between;
    a support sleeve formed of aluminum extending between said first fitting and said second fitting for applying tensile forces there-between and to said tension rod;
    wherein downhole well temperatures define operating temperatures which exceed surface ambient atmospheric temperatures, and said support sleeve formed of said aluminum and said tension rod formed said fiber reinforced composite plastic material have different respective coefficients of thermal expansion, such that in traveling from the surface ambient atmospheric temperatures to the downhole operating temperatures, compressive preloads are applied to said support sleeve and tensile preloads are applied to said tension rod; and
    wherein said tensile preloads applied to said tension rod oppose compressive operating loads applied across the composite sucker rod and thereby reduces compressive loads applied to said tension rod, maintaining said tension rod in tension.

10. The composite sucker rod according to claim 9, wherein said support sleeve formed of said aluminum and said tension rod formed of said fiber reinforced composite plastic material which having respective coefficients of thermal expansion such that at the surface ambient atmospheric temperatures said compressive preloads and said corresponding tensile preloads are not applied to respective ones of said support sleeve and said tension rod.

11. The composite sucker rod according to claim 10, wherein said first fitting and said second fitting each have recesses in opposed relative relation which define annular-shaped pockets for receiving opposite ends of said support sleeve.

12. The composite sucker rod according to claim 10, wherein said first fitting and said second fitting each have clamping members, and wherein opposite terminal end sections of said tension rod have exterior peripheries which are formed to define compound progressive indentions which fit in cooperative relation with formed surfaces of said clamping members to retain said terminal end sections within respective ones of said first fitting and said second fitting.

13. The composite sucker rod according to claim 9, wherein said support sleeve formed of an aluminum defines a continuous tubular sleeve which extends around said tension rod, from said first fitting to said second fitting.

14. The composite sucker rod according to claim 9, wherein said plastic material from which said tension rod is formed is a thermoset material.

15. The composite sucker rod according to claim 9, wherein said fiber reinforced composite plastic material of said tension rod is a carbon fiber reinforced phenolic material.

16. A composite sucker rod having a first end and a second end for connecting in a sucker rod string to power a downhole pump, the composite sucker rod comprising:
  a first fitting disposed on said first end for operatively connecting the composite sucker rod to a first adjacent member;
  a second fitting disposed on said second end for operatively connecting the composite sucker rod to a second adjacent member;
  a tension rod formed of a carbon fiber reinforced phenolic material, said tension rod extending between and secured to said first fitting and said second fitting for transmitting power forces there-between;
  a support sleeve defined by a tubular aluminum sleeve which extends around said tension rod, from said first fitting to said second fitting, and which abuts said first fitting and said second fitting for applying tensile forces there-between and to said tension rod;
  a compressive preload applied to said support sleeve and a corresponding tensile preload applied to said tension rod, wherein said tensile preload opposes compressive operating loads applied across the composite sucker rod and thereby reduces compressive loads applied to said tension rod; and
  wherein downhole well temperatures define operating temperatures which exceed surface ambient atmospheric temperatures, and said support sleeve and said tension rod are formed of aluminum and carbon fiber reinforced phenolic material, respectively, which having respective coefficients of thermal expansion such that at the surface ambient atmospheric temperatures said compressive preloads and said corresponding tensile preloads are not applied to respective ones of said support sleeve and said tension rod, and at the operating temperatures said compressive preloads and said corresponding tensile preloads are applied to said support sleeve and said tension rod, respectively, maintaining said tenion rod in tension.

17. The composite sucker rod according to claim 16, wherein said first fitting and said second fitting each have recesses in opposed relative relation which define annular-shaped pockets for receiving opposite ends of said support sleeve.

18. The composite sucker rod according to claim 17, wherein said support sleeve is a continuous tubular sleeve formed of an aluminum material.

19. The composite sucker rod according to claim 16, wherein said first fitting and said second fitting each have clamping members, and wherein opposite terminal end sections of said tension rod have exterior peripheries which are formed to define compound progressive indentions which fit in cooperative relation with formed surfaces of said clamping members to retain said terminal end sections within respective ones of said first fitting and said second fitting.

* * * * *